May 24, 1938.  B. DIBNER  2,118,666
CABLE CONNECTER
Filed Feb. 20, 1936  2 Sheets-Sheet 1

INVENTOR.
Bern Dibner
BY Harry Ernest Rubens
ATTORNEY.

May 24, 1938.    B. DIBNER    2,118,666
CABLE CONNECTER
Filed Feb. 20, 1936    2 Sheets-Sheet 2

INVENTOR.
Bern Dibner
BY Harry Ernest Rubens
ATTORNEY.

Patented May 24, 1938

2,118,666

UNITED STATES PATENT OFFICE 2,118,666

CABLE CONNECTER

Bern Dibner, Peekskill, N. Y., assignor to Burndy Engineering Co., Inc., a corporation of New York Application February 20, 1936, Serial No. 64,805

5 Claims. (Cl. 24—126)

This invention relates to connecters and, more particularly, relates to a mechanical wire and cable splicing means for use in connection with wires and cables in tension.

In the original construction of cable connecters, it was the practice to provide two substantially symmetrical tapered units which were suitably secured to each other.

More recently this has been replaced by a single integral unit having tapered ends. When, however, an integral unit is used, the problem of removing the wire without a tool in the event that the connecter is to be re-used has not heretofore been satisfactorily solved. In the previous attempts it was either necessary to forego re-using the connecter and the one end of the wire still attached to it, which has many disadvantages both economical and mechanical, or it was necessary to provide a separate tool for removing the wires from the connecter. The provision, however, of a separate tool is unsatisfactory in practical operations.

Some attempts were made to provide a single piece connecter which did not require a separate tool by providing an opening through which any sort of instrument, such as a nail, could be inserted for releasing the wire. However, these have been impractical and, moreover, no satisfactory provision was made against the formation of ice due to entrapped water entering the connecter through these openings. During cold weather, freezing of the water bursts the casing of the connecter resulting in damage to the transmission line. I provide novel longitudinal slots so placed in the casing as to permit water drainage and prevent bursting of the shell due to freezing of the water.

Other advantages of my novel slots are that they permit ready inspection of the interior of the connecter for noting the proper position of the cable end during insertion thereof, and to permit simple release of the connecter from the gripped cable by merely inserting the end of a screw driver or a nail to move the gripping members inwardly axially.

The wire gripping means generally comprise, in my preferred construction, three jaw members having unique toothed internal surfaces arranged in each end of the cable. To this end, connecters of the prior art are either provided with clamps for the jaws which tend to close the jaws inwardly and thus restrict free insertion of a wire end, or have no particular normal position, permitting easy dislocation of the jaws. According to my invention, the jaws are normally mechanically biased radially outward, so that the cable end is easily inserted there-between, since they do not have to be pried open but normally move apart during cable insertion. I provide a spring cup or plate connecting the ends of these jaws to form a unitary gripping assembly for each side of the connecter. These jaws maintain their relative spacing and position and cannot be dislocated to interfere with the proper functioning of the connecter. Moreover, these jaws are arranged, by the spring action at their ends connected to the common plate, to normally move outward radially.

The spring cup connecting the jaws forms an opening or space beyond the heels or inner ends of the jaws to permit frayed or distorted cable strands to project beyond the jaw ends so as not to interfere with the gripping action of the jaws upon the otherwise smooth surface of the cable. The face of the spring cup abuts the spacing spring making unnecessary a special cup or metal plate for the coiled spring to press against.

Heretofore, the casings of prior connecters have been manufactured of pure copper in order to obtain the highest degree of conductivity. I have discovered that due to the cross-sectional area of which connecters have been made, which is large in comparison with the wires themselves, that the resistance is so lowered, that it is unnecessary to use pure copper. More important than the question of high conductivity is the question of tensile strength, and that connecters made of a copper alloy having a high tensile strength and having a definite yield point so as to avoid the creep of the metal which is usual in ordinary connecters made of pure copper, is more important than the high conductivity obtained by the use of pure copper. I have furthermore found that the large area of contact between the jaws, connecter and conductor is great enough to avoid a consideration of the conductivity of these elements, and I have found that it is more important than ever to make these jaws of metal having an extremely high degree of hardness, irrespective of its conductivity. Hardness is important in the jaws because the jaws are constantly under compression and must be harder than the skin of the hard drawn copper wire in order for the serrated contact surface to grip the wire. A high tensile strength is important in the casing because the casing is constantly under tension.

Accordingly, a primary object of my invention is to provide a connecter for mechanically splicing a cable, having a casing of high tensile strength, and a definite elastic limit or yield point, and having gripping jaws made of metal of a high degree of hardness.

Other objects of my invention are to have a connecter made of a metal that is malleable and that is corrosion resistant.

Another object of my invention is to provide a connecter manufactured in alloy having a high tensile strength and a definite yield point, having an equivalent conductivity not less than that of the conductor itself.

An additional object of my invention is to provide a connecter for mechanically splicing a cable having provision for water drain and which will not burst in cold weather.

Another object of my invention is to provide a connecter for mechanically splicing a cable having a unitary gripping structure at both ends.

Another object of my invention is to provide a connecter for mechanically splicing a cable with provision for internal inspection thereof.

A further object of my invention is to provide a connecter for mechanically splicing a cable having a recess for frayed or distorted cable ends to prevent interference with the operation of the gripping jaws.

Still a further object of my invention is to provide a novel integral connecter for mechanically splicing a cable which may be readily released from the cable by the use of a nail, screw driver or similar tool end.

These and other objects of my invention will become apparent in the description to follow in connection with the drawings, in which.

Figures 8 to 17 inclusive are illustrations of modifications for connecting the jaw members to the spring fingers in forming a gripping structure.

Figure 1:
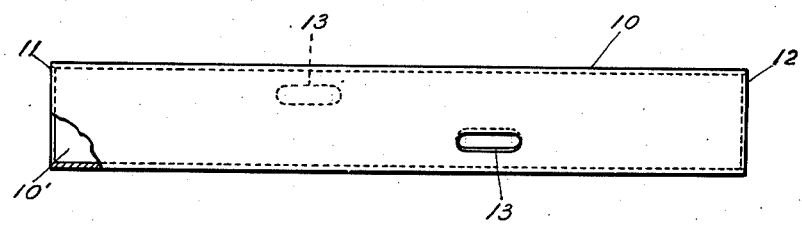
Figure 1 is an elevation, partially cut away, of the connecter shell before forming the connecter.

The casing for the connecter is formed of the metal tube 10 illustrated in Figure 1. The ends 11 and 12 of the tube 10 are chamfered, preferably at a 45° angle. The longitudinal slots 13 are made in the tube on opposite sides and staggered on either side of the center. The purpose of these slots will be set forth in detail hereinafter. The material of the casing should have an elastic limit exceeding the ultimate tensile strength of the maximum size of the cable it is designed to grip. The casing operates under a steady tension which sets up high circumferential stresses therein. To avoid elongation or gradual creepage of the casing, an alloy having an elastic limit in excess of 25,000 pounds per square inch, for example, should be used when designed for hard drawn copper cables or wires.

I have satisfactorily used a cadmium copper alloy of the following composition by weight:

|  | Percent |
|---|---|
| Copper | 98.5 |
| Cadmium | 1.0 |
| Tin | 0.5 |

Figure 2:
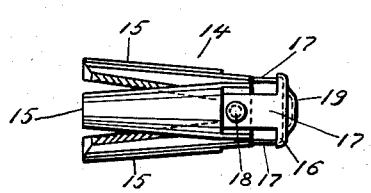
Figure 2 is an elevation of a preferred embodiment of the unitary gripping structure with the jaws spread apart.
Figure 3:
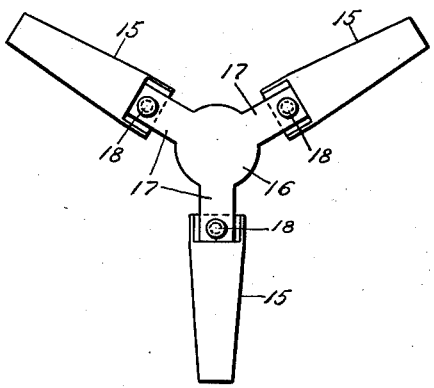
Figure 3 is a plan view of the jaw assembly before being bent to form the gripping structure as shown in Figure 2.

The unitary gripping member 14 for either end of the connecter is illustrated in Figure 2. This comprises three gripping jaws 15 connected by a spring cup 16. Figure 3 shows a preferred manner for producing the gripping structure. The ends of the jaws 15 are riveted to the fingers 17 by means of protuberances 18 formed at the end of the jaw 15 which act as rivet heads. The plate 16 forming the spring cup is of material which has a spring-like action so that when the fingers 17 are bent over as shown in Figure 2, the jaws 15 will be mechanically biased radially outward. The central portion 19 of the plate 16 is cupped as shown in Figure 2.

Figure 4:
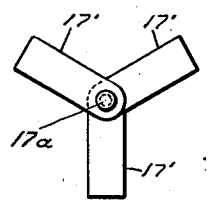
Figure 4 is a modification of the spring connecting member for the jaws of the gripping assembly.

Figure 4 is a modification of spring plate 16 construction wherein the fingers 17' corresponding to the fingers 17 of the spring plate 16 are individual and are joined together at 17a in any suitable manner such as riveting or welding.

Figure 5:
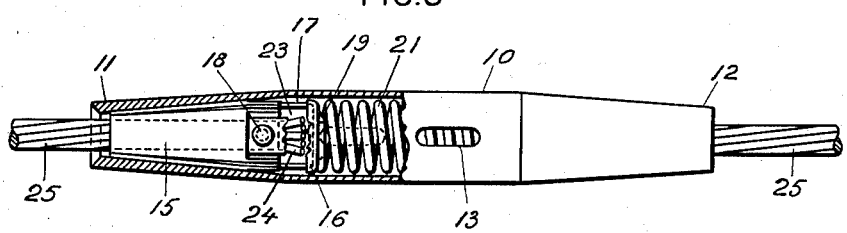
Figure 5 is a partial sectional elevation of the completed connecter gripping cable ends.

Figure 5 is a partial section elevation of the assembled connecter. This connecter is produced as follows:—One end of the casing 10, for example, end 11, is tapered, preferably by swaging. A rotary swaging machine operating on the end of tube 10 (without the use of a mandrel) will most suitably form such a taper. The gripping member 14 is then inserted in tube 10 and positioned in the tapered section 11. A coiled spacing spring 21 (Figure 5) is then placed in the tube, abutting the face of spring cup 16 of the first gripping member. The second gripping member (not shown) is then inserted in its proper relation so that its spring cup abuts the spring 17. The untapered end 12 is then tapered in the rotary swaging machine to totally enclose the internal gripping structure, completing the connecter as illustrated in Figure 5.

Figure 6:
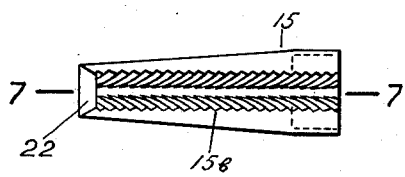
Figure 6 is a plan view of a preferred form of the jaw member showing the serrated surface.
Figure 7:
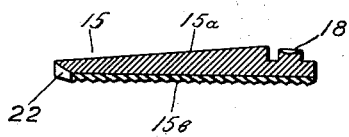
Figure 7 is a sectional view along 7—7 of Figure 6.

A preferred embodiment of a gripping jaw 15 is illustrated in Figures 6 and 7. The jaw 15 is essentially a truncated cone sector. The outer wall 15a is smooth and curved to conform to the interior of the tapered casing ends. The inside surface of the jaw 15 has a series of herringbone serrations arranged to grip the cable. Figure 6 illustrates the gripping face 15b of the jaw 15. To increase the gripping power of the jaws, I provide teeth inclined to the axis of the wire, the height of said teeth being highest at the outer edges of the jaw and gradually diminishing to zero at the center of the jaw. Such an arrangement creates no annular nicks in the gripping conductor. Annular ridges have heretofore been used on the gripping jaws instead of the herringbone serrations described herein. Conductors spliced in outdoor installations are subject of continued vibration which tends to concentrate bending forces at nicked points resulting in time in fractures of the conductor due to the reduced cross section. My method of forming the gripping surfaces prevents a reduction in the net cross section of the cable which is gripped. Another advantage is that two sets of gripping surfaces for each gripping jaw 15 provides a set of six gripping surfaces when three gripping jaws 15 are employed for a connecter end. More than three jaws may be used for the gripping member 14, instead of three according to my preferred embodiment thereof.

Figure 7 is a central cross section through Figure 6, showing the tapering construction of the jaw member 15. The mouth 22 of the jaw 15 is belled to facilitate entry of distorted or frayed cable ends into the connecter. The projection 18 is formed at the end of the jaw for riveting of the jaw members to the fingers 17 of the spring cup 16. The jaw member 15 is arced so that when it is inserted in the tapered sections 11 and 12 of the casing, it will conform to the inner surface thereof.

The fingers 17 of the spring cup 16 normally spread apart so that the jaw members of the gripping assembly 14 are mechanically biased outwardly radially. The fingers 17 are spread out by the spring-like action of the material used to form the cup 16. The jaw members 15 are accordingly normally spread apart before being enclosed in the shell 10 of the connecter, as illustrated in Figure 2. The spreading action of the gripping jaws together with the belled jaw mouth 22, and belled or chamfered shell openings 11 and 12 provide ready entry for the conductor end. This arrangement is particularly suited for stranded cables having distorted or frayed ends. If the cable end should abut the jaws on insertion, it would move them inwardly and the jaws would naturally spread radially to avoid cable entry interference.

The fingers 17 of the spring cup 16 are made relatively long so that an appreciable recess 23 or space is provided between the jaw heels and the face of the cup 16. The distorted cable ends 24 will enter said recess 23 so as not to interfere with the gripping action of the serrated surfaces 15b of the jaw 15 upon the otherwise smooth surface of the cable 25. For proper operation of the gripping jaws, it is necessary, after first inserting the cable ends, for the jaw to follow the cable and grip it when the cable is tensed. This is possible only when the jaw 15 to cable 25 friction exceeds the jaw 15 to shell 10 friction. An important feature of my invention is to graphitize the inner walls of the shell 10 to form an antifriction facing. The interior 10' of the shell 10 is graphitized while the shell is still in the tubular form of Figure 1 in a manner well known in the art. Thus, the jaws 15 will follow and grip the cable at all times avoiding any trouble of sticking of the jaw members.

The successful operation of the connecter depends upon the ability of the jaws 15 to fasten themselves onto the cable 25 and be drawn into a wedging action. It is necessary that the contacting faces 15b of the jaws be of hard material. However, the mechanical function of the jaws is supplemented by the necessity for the jaws to transmit current from the cable, through the shell and on to the adjacent cable. Hardened copper alloys have heretofore been used alloyed with elements which greatly reduce their conductivity to values of approximately 6 or 7 per cent International Annealed Copper Standard. Although the jaws have considerable cross-section for the current to flow through, there is a minimum conductivity which is necessary for efficient operation. I provide a copper alloy which has sufficient hardness, and electrical conductivity in excess of 15% of the International Annealed Copper Standard. The preferable hardness should be in excess of F 80 Rockwell. A suitable copper alloy is:

| | Per cent |
|---|---|
| Copper | 98.5 |
| Chromium | 1.0 |
| Aluminum | 0.5 |

Such alloys as have these properties will have a conductivity of less than 40% I. A. C. S.

The electrical circuit between the cable 25 ends is sustantially the series path from one cable end 25 through the corresponding jaw members 15, through the graphite layer 10' to the shell 10 across the shell 10, to the opposite jaw members across the graphite layer, to the other cable 25 end, completing an electrical splice having a conductivity at least of the order of that of the cable that the connecter is designed to splice.

Figure 8:
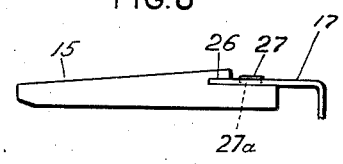

Figures 8 to 17 illustrate various methods for attaching the jaw members 15 to the spring cup fingers 17 so that the jaw members 15 will be under a radial spreading action. The jaw member 15 of Figure 8 has a recess 26 and a surface projection 27. The end of the finger 17 is inserted in the recess 26, and the projection 27 sets into a corresponding hole 27a in the finger 17. A modification of Figure 8 is had in Figure 9 where a projection 28 is placed in the finger 17. The jaw 15 is attached to the finger 17 by inserting the finger end into the recess 26 and locking the projection 28 in a corresponding cavity 28a in the jaw member.

Figure 10:
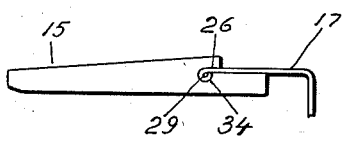
Figure 11:
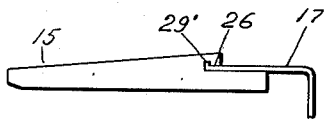

A simple method for attaching the jaw 15 to the spring finger 17 is illustrated in Figure 10. The end finger 17 is curled over at 29. A groove is placed at the end of the recess 26 for the curled edge 29 to slide into. The end 29 is slid into the groove 34 from the side to lock the finger and jaw. Figure 11 illustrates a method similar to that of Figure 10, modifying the end 29' of the finger 17, showing a square bend. The finger 17 may be spot welded to the jaw 15 instead of mechanical interlocking.

Figure 13:
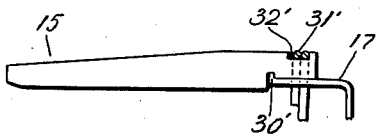
Figure 12:
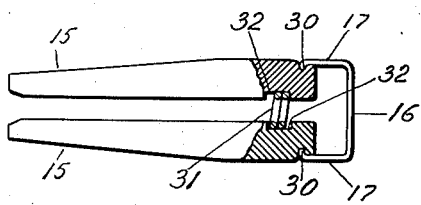

In Figures 12 and 13 are illustrated two modifications of still another method of forming the unitary gripping member 14 according to my invention. The jaws 15 are grooved to receive the bent ends 30 of the fingers 17. A coil spring 31 is placed in the interior of the jaw assembly resting against grooves 32 therein. Figure 13 illustrates the use of a spring 31' placed around an exterior groove 32' of the jaw heels. The finger ends 30' are set into corresponding grooves on the interior surface of the jaws. The leverage action provided by this construction, together with the spring tension applied at the jaw member ends, provide the desirable radial spreading action of the jaw members as a unitary gripping member construction.

Figure 14:
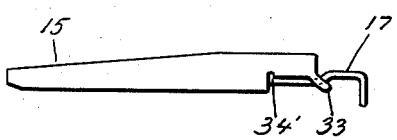
Figure 9:
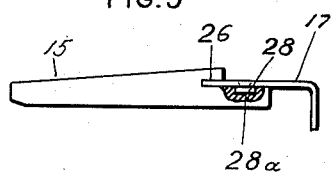
Figure 15:
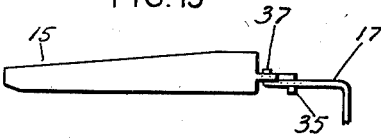
Figure 16:
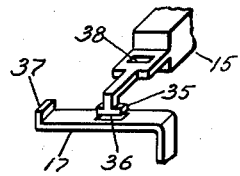

Figure 14 illustrates a curved projection 33 beyond the jaw end. The finger 17 has a hole wherein the projection 33 is inserted. The end 34' is bent to cooperate with a corresponding channel in the interior surface of the jaw 15. Figure 15 is a modification of Figure 14 wherein the end 35 of the projection 33 is widened and bent over. Figure 16 is a perspective view of the end portion of the jaw 15 illustrating this modification. A narrow slot 36 is made in the finger 17, corresponding in width to the projection 35, its length being as wide as the edge 35. The jaw member is locked to the finger 17 by first inserting projecting edge 35 through the slot 36, then turning the jaw 90° so that the jaw and finger 17 will be aligned for engagement of the bent finger end 37 into a slot 38 of the jaw 15, as illustrated in Figure 15.

Figure 17:
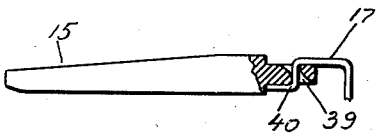

A further modification resides in forming a slot 39 in the heel of the jaw 15 and inserting a compound bent finger end 40 therein as illustrated in Figure 17. Many further modifications may be made to form the unitary gripping assembly 14 of the jaws 15 and spring members. In Figures 8 to 17 I have illustrated practical commercial methods attaching the spring cup 16 to the jaws 15 to provide for the jaws normally to spread apart radially. The jaw spreading is due to the spring action of the fingers 17.

An important feature of my invention is to provide a unitary gripping assembly for each end of the connecter with jaws normally mechanically biased radially outward within the connecter. As hereinbefore stated, this construction results in a spreading action of the jaws when they are pushed toward the center of the connecter for accommodating roughened, frayed or flattened ends of wires or cables that are to be inserted. The provision of an enlarged chamber or recess 23 beyond the heels of the jaws 15 prevents interference with the proper functioning of the jaw gripping action by distorted cable ends. Another advantage is that it is impossible for one jaw element to move axially ahead of any of the others; or for the jaw to be deranged or otherwise forced out of their proper operative position.

The longitudinal slots 13 placed in the central portion of the shell 10 provide for water drainage and therefore prevent any accumulation of water within the connecter. In freezing weather it is essential that proper water drainage be provided since the shell would otherwise be burst open by the expansive forces of ice formation within the shell. The oppositely disposed openings which I provide in the shell suitably drain the water so that at no time will any bursting forces occur even though a small amount of water may be within the connecter. A further advantage of the slots is that they permit visual inspection in the interior of the connecter to note the proper position of the cable end when it is introduced for gripping action.

A further great advantage of the slots is that they permit the release of the cable from the connecter in a very simple manner. This is accomplished by inserting a nail, the end of a screw driver or the point of any tool through the slot 13, to push back the spring or jaw assembly for releasing the grip of the jaw members upon the cable end so that the cable may be readily withdrawn. It is essential to provide for such release with the enclosed type of connecter. One would otherwise not be able to retrieve or reuse the connecter, and the section of the conductor ends contained therein would necessarily be cut off. On many occasions it is important to preserve the original conductor length. The simple removal of the connecter which the slots 13 permits as well as the preservation of the conductor length, is greatly advantageous since no special tools are required and no wasting of conductor length is necessary. The longitudinal slots 13 are placed on opposite sides of the casing 10 to avoid any structural weakening of the connecter and preserve its tensile strength.

The tapering of the end portions of the connecter permits cable splicing and subsequent passage over sheaves on the towers in the construction of outdoor transmission lines. The tapering of the shell ends encloses the gripping members to form a unitary connecter. Since the tapering is accomplished by swaging, a gradual thickening toward the end portions results as is known in the art. The metal used for the casing is designed to have a tensile strength in excess of that of any cable it is to connect to avoid elongation or creepage when stressed.

The material of the connecter parts should resist corrosive action in out-door service, or when subjected to corrosive industrial atmospheres. The materials comprising the connecters should be electrochemically compatible, should be free from season cracking and dezincification or other physically destructive actions. The coefficient of thermal expansion of the connecter parts should be approximately that of the conductors so as to avoid relative movement of the connecter parts to interfere with the connecter in operation.

Although in the foregoing I have described several preferred embodiments of my invention, it will be obvious to those skilled in the art that modifications thereof are feasible and accordingly, I do not intend to be limited except as set forth in the following claims.

I claim:

1. In a connecter for connecting cables, a casing formed from metal tubing with tapered open ends for the insertion of cables therein; a set of gripping jaws located in and engaging the walls of each tapered end; a sheet metal cup-shaped cap having a series of sheet metal fingers extending therefrom, each of said fingers being secured to a gripping jaw, and causing said jaws to maintain a constant spaced circumferential and longitudinal relationship with each other; and a coil spring extending between said caps for holding them in spaced relation adjacent the open ends of said casing in gripping relation with the cables inserted in said casing.

2. In a connecter for splicing cables, a casing formed from metal tubing with tapered open ends for the insertion of cable into the casing; gripping jaw sections located in and engaging the walls of each tapered end; each section consisting of a plurality of jaws, said jaws having gripping teeth arranged in rows parallel to the longitudinal axis of the cable; the teeth extending at an angle oblique to the connecter axis; and a coil spring extending between said sets of jaws for holding them in spaced relation adjacent the open ends of said casing in gripping relation with the cable inserted in said casing.

3. In a connecter for splicing cables, a casing formed from metal tubing with tapered open ends for insertion of the cable into the casing; gripping jaw sections located in and engaging the walls of each tapered end; each section consisting of a plurality of jaws, said jaws having gripping teeth arranged in rows parallel to the longitudinal axis of the cable; the teeth extending at an angle oblique to the connecter axis and oblique to those in the adjacent rows; and a coil spring extending between said sets of jaws for holding them in spaced relation adjacent the open ends of said casing in gripping relation with the cable inserted in said casing.

4. In a connecter for splicing cables, a casing formed from metal tubing with tapered open ends for insertion of the cable into the casing; gripping jaw sections located in and engaging the walls of each tapered end; each section consisting of a plurality of jaws, each of said jaws having a plurality of rows of gripping teeth arranged parallel to the connecter axis, each row separated by non-gripping portions, the teeth extending at an angle oblique to the connecter axis and oblique to those in adjacent rows; and a coil spring extending between said sets of jaws for holding them in spaced relation adjacent the open ends of said casing in gripping relation with the cable inserted in said casing.

5. In a connecter for connecting cables, a casing formed from metal tubing with tapered open ends for the insertion of the cable therein; a set of gripping jaws located in and engaging the walls of each tapered end; said jaws having serrated teeth, the biting edge of each formed oblique to the longitudinal axis of the cables, and having a height varying from maximum to minimum depth; and a coil spring extending between said jaws for holding them in extended space relation adjacent the open ends of said casing in gripping relation with the cables inserted in said casing.

BERN DIBNER.